(12) United States Patent
Lee et al.

(10) Patent No.: US 8,975,824 B2
(45) Date of Patent: Mar. 10, 2015

(54) PWM DRIVING CIRCUIT AND PWM DRIVING METHOD

(71) Applicant: Samsung Electro-Mechanics Co., Ltd., Gyeonggi-do (KR)

(72) Inventors: Yun Joong Lee, Seoul (KR); Deuk Hee Park, Gyeonggi-do (KR); Sang Hyun Cha, Seoul (KR); Jae Shin Lee, Gyeonggi-do (KR); Chang Seok Lee, Gyeonggi-do (KR)

(73) Assignee: Samsung Electro-Mechanics Co., Ltd., Gyeonggi-Do (KR)

( * ) Notice: Subject to any disclaimer, the term of this patent is extended or adjusted under 35 U.S.C. 154(b) by 40 days.

(21) Appl. No.: 13/723,163

(22) Filed: Dec. 20, 2012

(65) Prior Publication Data

US 2013/0162164 A1    Jun. 27, 2013

(30) Foreign Application Priority Data

Dec. 26, 2011  (KR) .......................... 10-2011-0142419

(51) Int. Cl.
| H05B 37/02 | (2006.01) |
| H05B 39/04 | (2006.01) |
| H05B 41/36 | (2006.01) |
| G05F 1/00  | (2006.01) |
| H05B 33/08 | (2006.01) |

(52) U.S. Cl.
CPC ............ *H05B 37/02* (2013.01); *H05B 33/0815* (2013.01); *Y02B 20/346* (2013.01)
USPC .......................... 315/224; 315/209 R; 315/391

(58) Field of Classification Search
CPC ........... H05B 41/3925; H05B 41/2828; H05B 41/28; H05B 41/24; H05B 33/0815; H05B 33/0818; H01J 65/044; F02P 3/0884
USPC ................................ 315/224, 209, 223, 291
See application file for complete search history.

(56) References Cited

U.S. PATENT DOCUMENTS

| 8,390,262 | B2 * | 3/2013 | Chang et al. ............... 323/282 |
| 8,648,545 | B2 * | 2/2014 | Lee et al. .................. 315/291 |
| 8,653,751 | B2 * | 2/2014 | Shimizu et al. ............ 315/299 |
| 2009/0237007 | A1 * | 9/2009 | Leng .......................... 315/297 |
| 2011/0037407 | A1 * | 2/2011 | Ahn et al. ................... 315/287 |
| 2011/0254469 | A1 * | 10/2011 | Ruan et al. .................. 315/307 |
| 2012/0153848 | A1 * | 6/2012 | Shin et al. ................... 315/192 |
| 2012/0188487 | A1 * | 7/2012 | Hagino et al. ................ 349/69 |
| 2013/0009557 | A1 * | 1/2013 | Szczeszynski ............... 315/186 |

FOREIGN PATENT DOCUMENTS

| KR | 10-2007-0048065 A | 5/2007 |
| KR | 10-2007-0116439 A | 12/2007 |

* cited by examiner

*Primary Examiner* — Dylan White
(74) *Attorney, Agent, or Firm* — Bracewell & Giuliani LLP; Brad Y. Chin

(57) ABSTRACT

Provided is a PWM driving circuit and a PWM driving method. The PWM driving circuit includes a dimmer switching unit turning on a first switch to apply a first reference signal varied according to an input voltage of a system when an output voltage level of a dimmer is a reference level or less, and turning on a second switch to apply a second reference signal, unrelated to the input voltage of the system, when the output voltage level of the dimmer is more than the reference level, an error amplification unit comparing the first reference signal or the second reference signal with an output detection signal to amplify an error and outputting an error amplification signal, and a PWM control signal generating unit comparing the error amplification signal of the error amplification unit with a predetermined reference waveform to output a PWM control signal.

20 Claims, 4 Drawing Sheets

- PRIOR ART -

US 8,975,824 B2

PWM DRIVING CIRCUIT AND PWM DRIVING METHOD

CROSS-REFERENCE TO RELATED APPLICATIONS

This application claims the benefit of Korean Patent Application No. 10-2011-0142419 filed with the Korea Intellectual Property Office on Dec. 26, 2011, the disclosure of which is incorporated herein by reference.

BACKGROUND OF THE INVENTION

1. Field of the Invention

The present invention relates to a pulse width modulation (PWM) driving circuit and a PWM driving method, and more particularly, to a PWM driving circuit and a PWM driving method, which are feedback-controlled without a feedback loop, which is a secondary side, using a photo coupler.

2. Description of the Related Art

One of important specifications required for lighting devices using a light emitting diode (LED) as a light source is compatibility with a triac dimmer. In order to interconvert with the triac dimmer in an LED driving circuit having a switching mode power supply (SMPS) structure, a level of dimming must be detected to be reflected to a switch control signal.

Such a structure causes a decrease in line regulation performance. The line regulation performance is not required when the dimming is not performed.

When support for the triac dimmer is needed, a flyback structure shown in FIG. 4 may be used.

Here, a level of dimming is sensed by a photo coupler 600 to be reflected to a reference signal VREF, and thus, output control according to the level of dimming can be performed.

In a simple example, in this case, the reference signal VREF is varied in linear proportion to an input voltage VIN. Here, since the input voltage is reflected to the output, the line regulation performance is decreased.

SUMMARY OF THE INVENTION

The present invention has been invented in order to overcome the above-described problems and it is, therefore, an object of the present invention to provide a technique capable of removing a feedback structure through a photo coupler, which is a secondary side, and enabling control according to an output level of a dimmer, which is a primary side.

In accordance with one embodiment of the present invention to achieve the object, there is provided a PWM driving circuit including: a dimmer switching unit configured to turn on a first switch to apply a first reference signal varied according to an input voltage of a system when an output voltage level of a dimmer is a reference level or less or less than the reference level, and turn on a second switch to apply a second reference signal, unrelated to the input voltage of the system, when the output voltage level of the dimmer is more than the reference level or the reference level or more; an error amplification unit configured to compare the first reference signal or the second reference signal applied from the dimmer switching unit with an output detection signal fed back by detecting an output of the system to amplify an error and output an error amplification signal; and a PWM control signal generating unit configured to compare the error amplification signal of the error amplification unit with a predetermined reference waveform to output a PWM control signal.

In another example of the embodiment, the first reference signal may be a signal obtained by averaging the output of the dimmer.

In addition, according to one example, the PWM control signal generating unit may include a comparator configured to receive the error amplification signal at a non-inversion terminal and the predetermined reference waveform at an inversion terminal.

Here, in another example, the predetermined reference waveform may be any one of a sawtooth wave, a triangle wave, and a lamp wave.

Further, in another example of the embodiment, the dimmer may be a triac dimmer.

Furthermore, in one example, the PWM driving circuit may be an LED driving circuit.

In accordance with another embodiment of the present invention to achieve the object, there is provided a PWM driving circuit including: an error amplification unit configured to compare a reference signal varied according to an input voltage of a system with an output detection signal fed back by detecting an output of the system to amplify an error to output an error amplification signal; a compensation amplification unit configured to receive and compensation-amplify the error amplification signal of the error amplification unit; a dimmer switching unit configured to turn on a switch when an output voltage level of a dimmer is less than a reference level or the reference level or less such that an output of the error amplification unit bypasses the compensation amplification unit; and a PWM control signal generating unit configured to receive the error amplification signal of the error amplification unit or the output of the compensation amplification unit by switching of the dimmer switching unit to compare with a predetermined reference waveform and output a PWM control signal.

In another example of the embodiment, wherein the compensation amplification unit may compensation-amplify the signal in a phase opposite to a phase of the error amplification unit.

In addition, according to one example, the PWM control signal generating unit may include a comparator configured to receive the error amplification signal or the output of the compensation amplification unit at a non-inversion terminal and the predetermined reference waveform at an inversion terminal.

Here, in another example, the predetermined reference waveform may be any one of a sawtooth wave, a triangle wave, and a lamp wave.

Further, in another example of the embodiment, the dimmer may be a triac dimmer.

Furthermore, according to one example, PWM driving circuit may be an LED driving circuit.

In accordance with another embodiment of the present invention to achieve the object, there is provided a PWM driving method including: turning on a first switch to apply a first reference signal varied according to an input voltage of a system when an output voltage level of a dimmer is a reference level or less or less than the reference level, and turning on a second switch to apply a second reference signal, unrelated to the input voltage of the system, when the output voltage level of the dimmer is more than the reference level or the reference level or more; amplifying an error by comparing the applied first reference signal or the second reference signal with an output detection signal fed back by detecting an output of the system, and outputting an error amplification signal; and comparing the error amplification signal with a predetermined reference waveform to generate and output a PWM control signal.

In another example of the embodiment, the first reference signal may be a signal obtained by averaging the output of the dimmer.

In addition, according to one example, the PWM driving method may be a method of driving an LED driving circuit.

In accordance with another embodiment of the present invention to achieve the object, there is provided a PWM driving method including: amplifying an error by comparing a reference signal varied according to an input voltage of a system with an output detection signal fed back by detecting an output of the system, and outputting an error amplification signal; switching off a switch when an output voltage level of a dimmer is a reference level or more or more than the reference level to enter compensation-amplifying the error amplification signal, and switching on the switch when the output voltage level is less than the reference level or the reference level or less to bypass compensation-amplifying the error amplification signal; receiving and compensation-amplifying the error amplification signal according to the off operation of the switch in switching; and receiving the error amplification signal bypassed according to the on operation of the switch in switching or the output compensation-amplified in compensation-amplifying to compare with a predetermined reference waveform and generating and outputting a PWM control signal.

In another example of the embodiment, in compensation-amplifying, the signal may be compensation-amplified in a phase opposite to a phase in error-amplifying.

In addition, according to one example, the PWM driving method may be a method of driving an LED driving circuit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, exemplary embodiments of the present invention will be described in detail. However, the present invention is not limited to the embodiments disclosed below but can be implemented in various forms. To clearly describe the present invention, parts not relating to the description are omitted from the drawings. Like numerals refer to like elements throughout the description of the drawings.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. Terms representing directions may be interpreted to include relative directional concepts corresponding to the case in which a reference element is reversed or its direction is changed.

Terms used herein are provided for explaining embodiments of the present invention, not limiting the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, motions, and/or devices, but do not preclude the presence or addition of one or more other components, motions, and/or devices thereof.

First, a PWM driver circuit in accordance with a first exemplary embodiment of the present invention will be described in detail with reference to the accompanying drawings.

Figure 1:
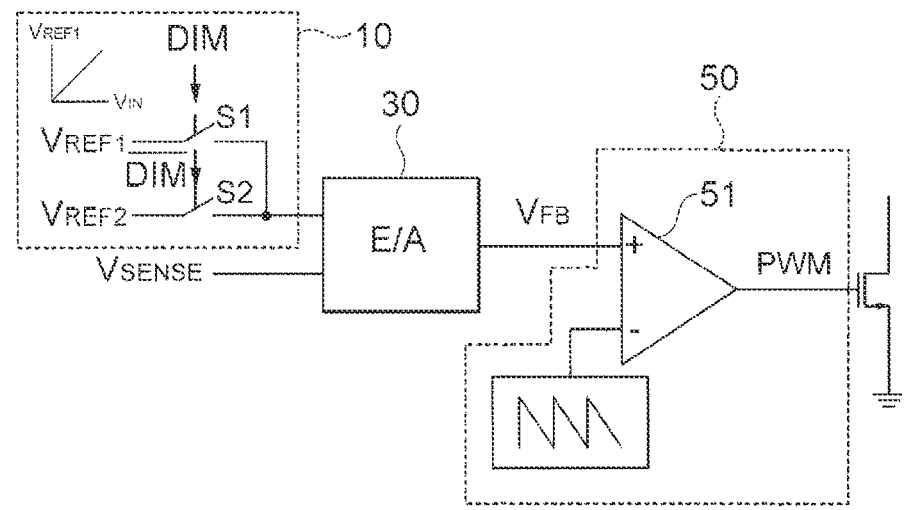
FIG. 1 is a circuit diagram schematically showing a PWM driving circuit in accordance with a first exemplary embodiment of the present invention.
Figure 3:
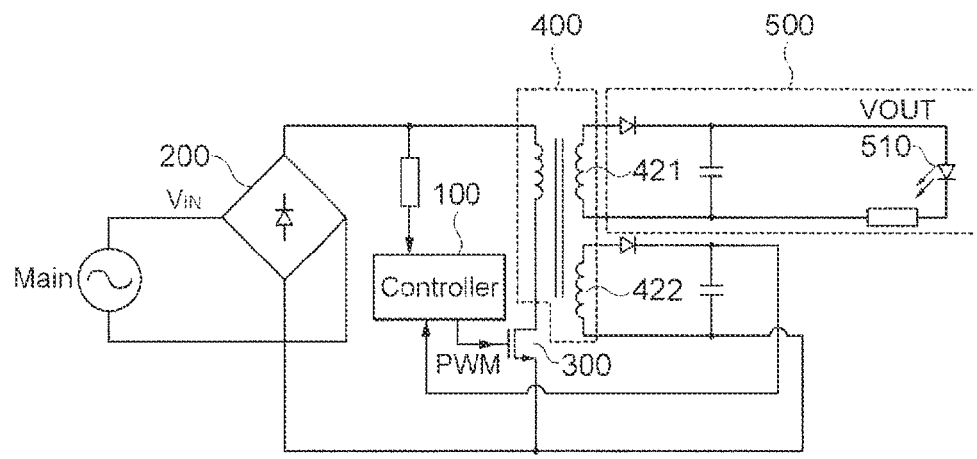
FIG. 3 is a circuit diagram schematically showing an LED driving device including the PWM driving circuit in accordance with an exemplary embodiment of the present invention.

FIG. 1 is a circuit diagram schematically showing a PWM driving circuit in accordance with a first exemplary embodiment of the present invention, and FIG. 3 is a circuit diagram schematically showing an LED driving device including the PWM driving circuit in accordance with an exemplary embodiment of the present invention.

Referring to FIG. 1, the PWM driving circuit in accordance with a first exemplary embodiment of the present invention includes a dimmer switching unit 10, an error amplification unit 30 and a PWM control signal generating unit 50.

Referring to FIG. 3, in one example, a PWM driving circuit 100 may be an LED driving circuit. In FIG. 3, reference numeral 510 designates an LED.

First, in FIG. 1, a dimmer switching unit 10 is described. The dimmer switching unit 10 turns on a first switch S1 to apply a first reference signal VREF1 varied according to an input voltage of a system when an output voltage level of a dimmer (not shown) is a reference level or less or less than the reference level. In addition, the dimmer switching unit 10 turns on a second switch S2 to apply a second reference signal VREF2, unrelated to the input voltage of the system, when the output voltage level of the dimmer (not shown) is more than the reference level or the reference level or more. Here, the reference level may be preset. The reference level may be set according to line regulation performance and a dimming range. Since when the reference level is low, the dimming range is limited, and when the reference level is high, the line regulation performance is reduced, the two performances may become factors for determining the reference level. In other words, the first reference signal VREF1 is varied in proportion to a level of the input voltage. For example, the first reference signal VREF1 may be a signal varied in proportion to an output of the dimmer (not shown). If only the first reference signal is used as a reference signal, the line regulation performance may be degraded. Accordingly, when the level of the first reference signal is a certain level or more, the second reference signal VREF2, which is a fixed level, is used as the reference signal. Here, since the reference signal is not varied according to variation in input level, the line regulation performance is improved.

When it is selected whether dimming such as triac dimming is interconverted outside a controller, it is determined whether the reference signal VREF is varied. Here, using a DIM signal output by comparing the output voltage level of the dimmer (not shown) and the reference level, the first reference signal VREF1 varied according to an input voltage VIN of the system and the fixed second reference signal VREF2, unrelated to the input voltage of the system, may be selected. For example, the DIM signal may be an output signal obtained by comparing the dimmer output signal with the reference level through a comparator (not shown). For example, when the output level of the dimmer is the reference level or less or less than the reference level, the first reference signal VREF1 varied according to the input voltage VIN of the system may be selected depending on the output DIM signal, and when the output level of the dimmer is more than the reference level or the reference level or more, the fixed second reference signal VREF2, unrelated to the input voltage of the system may be selected depending on the output DIM signal.

In addition, in one example, the first reference signal VREF1 may be a signal obtained by averaging the output of the dimmer (not shown). That is, when the output voltage level of the dimmer is the reference level or less or less than the reference level, the signal obtained by averaging the output levels of the dimmer may be input into the following error amplification unit 30, rather than the fixed signal unrelated to the input voltage of the system. The signal obtained by averaging the dimmer output levels may be an average of the input signals passed through a bridge circuit (see 200 of FIGS. 3 and 4) for one cycle. That is, the average may be a half cycle average of the input signal before passing through the bridge circuit 200.

In another example, the dimmer (not shown) may be a triac dimmer.

Next, in FIG. 1, the error amplification unit 30 compares the first reference signal VREF1 or the second reference signal VREF2 applied from the dimmer switching unit 10 with an output detection signal $V_{SENSE}$ fed back by detecting the output of the system to amplify an error. The error amplification unit 30 may be constituted by an error amplifier. For example, the first reference signal VREF1 or the second reference signal VREF2 may be input into a non-inversion input terminal, and the fed back output detection signal $V_{SENSE}$ may be input into an inversion input terminal. The error amplification unit 30 outputs the amplified error amplification signal to a PWM control signal generating unit 50. Depending on whether the output voltage level of the dimmer (not shown) is the reference level or less or less than the reference level, or more than the reference level or the reference level or more, the error amplification unit 30 receives the first reference signal VREF1 or the second reference signal VREF2 as the reference signal. Here, the error amplification unit 30 compares the input reference signal with the output detection signal $V_{SENSE}$ fed back from the output of the system to amplify the error.

Next, in FIG. 1, the PWM control signal generating unit 50 compares an error amplification signal $V_{FB}$ of the error amplification unit 30 with a predetermined reference waveform to generate and output a PWM control signal. In FIG. 1, the error amplification signal $V_{FB}$ of the error amplification unit 30 is applied to the PWM control signal generating unit 50. Here, a level of the error amplification signal $V_{FB}$ is varied according to a difference between the reference signal and the fed back output detection signal $V_{SENSE}$. In addition, as the varied level signal is compared with the predetermined reference waveform, a length of a high section of the PWM control signal is varied.

Accordingly, as the first reference signal VREF1 varied according to the input voltage of the system, rather than the conventional fixed reference signal, and the fixed second reference signal VREF2 according to the output level of the dimmer when the first reference signal is increased to a certain level or more are compared with the feedback signal $V_{SENSE}$, the feedback control may be performed with no interference with the line regulation performance. That is, when the fixed reference signal is used as in the conventional art, the dimmer cannot be interconverted. Here, when the reference signal is always in proportion to the input voltage to interconvert the dimmer, the line regulation performance may be degraded. As the reference signal is fixed when the reference signal becomes a certain level or more in consideration of the two circumstances, the feedback control can be performed with no interference with the line regulation performance.

In addition, according to one example, the PWM control signal generating unit 50 includes a comparator 51 configured to receive the error amplification signal in a non-inversion state and receive a predetermined reference waveform in an inversion state.

In one example, the predetermined reference waveform may be any one of a sawtooth wave, a triangle wave, and a lamp wave. The reference waveform may be generated by a pulse generator (not shown), and the other waveforms may be used as a reference signal for generating a PWM control signal.

Figure 4:
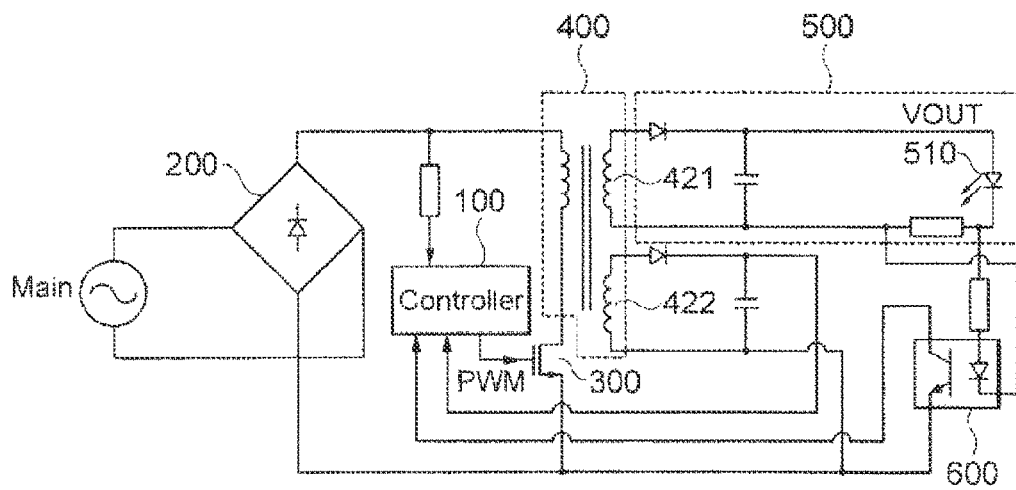
FIG. 4 is a circuit diagram schematically showing an LED driving device including a feedback loop from a secondary side using a conventional photo coupler.

In accordance with the embodiment of the present invention, as described above, as the feedback control is used regardless of compatibility of the dimming such as triac dimming, with no interference with the line regulation performance, a feedback loop from a secondary side using a photo coupler 600, which was used in the conventional art shown in FIG. 4, is removed, and a feedback structure from a primary side, i.e., the output level of the dimmer (not shown) becomes possible.

In addition, in the embodiment, as an external control signal and a switch in proportion to the output level of the dimmer (not shown) are used, the same controller may be used regardless of compatibility of the dimmer such as a triac dimmer.

Next, a PWM driving circuit in accordance with a second exemplary embodiment of the present invention will be described in detail with reference to the accompanying drawings.

Figure 2:
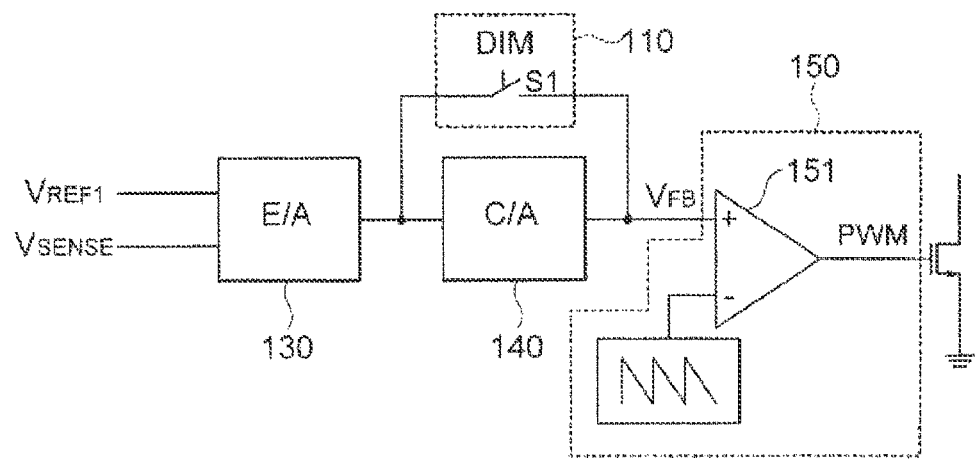
FIG. 2 is a circuit diagram schematically showing a PWM driving circuit in accordance with a second exemplary embodiment of the present invention.

FIG. 2 is a circuit diagram schematically showing the PWM driving circuit in accordance with a second exemplary embodiment of the present invention, and FIG. 3 is a circuit diagram schematically showing the LED driving device including the PWM driving circuit in accordance with an exemplary embodiment of the present invention.

Referring to FIG. 2, the PWM driving circuit in accordance with a second exemplary embodiment of the present invention includes an error amplification unit 130, a compensation amplification unit 140, a dimmer switching unit 110 and a PWM control signal generating unit 150.

Referring to FIG. 3, in one example, the PWM driving circuit 100 may be the LED driving circuit.

First, in FIG. 2, the error amplification unit 130 compares a reference signal VREF1 varied according to the input voltage of the system with an output detection signal $V_{SENSE}$ fed back by detecting the output of the system to amplify an error, and outputs the amplified error amplification signal. The error amplification unit 130 may be constituted by an error amplifier. The reference signal VREF1 varied according to the input voltage of the system may be a signal varied in proportion to the output of the dimmer (not shown). For example, the reference signal VREF1 varied according to the input voltage of the system may be input into the non-inversion input terminal, and the fed back output detection signal $V_{SENSE}$ may be input into the inversion input terminal. In addition, in one example, the reference signal VREF1 input into one input terminal of the error amplification unit 130 may be a signal obtained by averaging the output of the dimmer (not shown).

Next, referring to FIG. 2, the compensation amplification unit 140 receives and compensation-amplifies the error amplification signal of the error amplification unit 130. Here, the compensation amplification unit 140 is provided to compensate an error due to a fed beck delay.

In addition, in one example, the compensation amplification unit 140 compensation-amplifies the signal in a phase opposite to a phase of the error amplification unit 130. The compensation amplification unit 140 may be configured by further providing an amplifier having a phase opposite to the phase of an error amplifier (E/A). For example, when the error amplifier E/A of the error amplification unit 130 is an amplifier having a positive gain, a compensation amplifier C/A having a negative gain may be added to configure the compensation amplification unit 140.

Next, in FIG. 2, the dimmer switching unit 110 turns on a switch S1 when the output voltage level of the dimmer (not shown) is less than the reference level or the reference level or less so that the output of the error amplification unit 130 bypasses the compensation amplification unit 140. Accordingly, when the output voltage level of the dimmer (not shown) is the reference level or less or less than the reference level, the reference signal VREF1 varied according to the input voltage of the system is compared with the fed back output detection signal $V_{SENSE}$ in the error amplification unit 130 of FIG. 2 so that the error-amplified output bypasses the compensation amplification unit 140 to be operated like the first embodiment of the present invention. On the other hand, when the output voltage level of the dimmer (not shown) is more than the reference level or the reference level or more, the reference signal VREF1 varies according to the input voltage of the system is compared with the fed back output detection signal $V_{SENSE}$ so that the output amplified in the error amplification unit 130 passes through the compensation amplification unit 140 to offset a gain of the error amplification unit 130 and a gain of the compensation amplification unit 140 regardless of variation in input voltage, operating like the first embodiment of the present invention. As a result, the line regulation performance can be improved. Here, the dimmer switching unit 110 includes a comparator (not shown) configured to compare the output voltage of the dimmer (not shown) with the reference level to determine whether the output signal of the comparator bypasses the compensation amplification unit 140 using a DIM signal, which is a switch-applied signal.

In addition, in one example, the dimmer (not shown) may be a triac dimmer.

Next, in FIG. 2, the PWM control signal generating unit 150 receives the error amplification signal of the error amplification unit 130 by the dimmer switching unit 110 or the output of the compensation amplification unit 140 to compare it with the predetermined reference waveform, outputting the PWM control signal. The PWM control signal generating unit 150 compares the error amplification signal or compensation amplification signal $V_{FB}$ with the reference waveform. Here, since a level of $V_{FB}$ is varied, $V_{FB}$ is compared with the reference waveform to change a length of a high section of the PWM control signal. Accordingly, as the reference signal VREF1 varied in proportion to the input voltage of the system, for example, the output level of the dimmer (not shown), is compared with the feedback signal to be error-amplified, compatibility of the dimmer (not shown) become possible. Here, when the reference signal VREF1 is compared with the feedback signal to be controlled by the error-amplified signal only, the line regulation performance may be degraded. Accordingly, when the output voltage of the dimmer (not shown) is the reference level or more or more than the reference level, the gain of the error amplification signal is offset through the compensation amplification unit 140 to be controlled with the compensation amplification signal $V_{FB}$, unrelated to the input signal of the system, performing feedback control with no interference with the line regulation performance.

In addition, according to one example, the PWM control signal generating unit 150 includes a comparator configured to receive the error amplification signal or the output of the compensation amplification unit 140 at a non-inversion terminal and receive the predetermined reference waveform at an inversion terminal.

In another example, the predetermined reference waveform may be any one of a sawtooth wave, a triangle wave, and a lamp wave. The other waveforms may be used as a reference signal for generating a PWM control signal.

In accordance with the embodiment of the present invention, as described above, as the feedback control is used regardless of compatibility of the dimming such as triac dimming, with no interference with the line regulation performance, a feedback loop from a secondary side using a photo coupler 600, which was used in the conventional art shown in FIG. 4, is removed, and a feedback structure from a primary side, i.e., the output level of the dimmer (not shown) becomes possible.

In addition, in the embodiment, as an external control signal and a switch in proportion to the output level of the dimmer (not shown) are used, the same controller may be used regardless of compatibility of the dimmer such as a triac dimmer. Further, slope compensation can also be supported using a compensation amplifier. That is, when the slope of the error amplification unit 130 is deviated from required specification, the gain can be reduced using the compensation amplification unit 140 having an opposite polarity.

Next, operations of the PWM driving circuit in accordance with the first and second exemplary embodiments of the present invention will be described in detail with reference to FIG. 3.

Referring to FIG. 3, an AC power supply is rectified in the bridge rectifying circuit 200 and input into a primary side winding of a transformer 400. Here, as the power transistor 300 is operated, an input power is applied to the primary side winding of the transformer 400. The voltage converted by the transformer 400 according to an ON operation of the power transistor 300 controlled by the PWM driving circuit 100, which is a controller, is applied to a secondary side main winding 421, and the secondary side main winding 421 provides a direct current power to an LED 510 from a secondary side output unit 500 through a diode and a smoothing capacitor. Here, not providing the photo coupler 600 for feedback of the secondary side output provided to the LED 510 like FIG. 4, only an output through a secondary side auxiliary winding 422 is detected to be fed back to the PWM driving circuit 100, which is a controller.

In the PWM driving circuit 100 as a controller, feedback control through the conventional photo coupler 600 shown in FIG. 4 is not performed, and control according to the output level of the dimmer (not shown) at the primary side is performed. As a result, the control can be used regardless of compatibility of the dimmer, with no interference with the line regulation performance.

Next, a PWM driving method in accordance with a third exemplary embodiment of the present invention will be described in detail with reference to the accompanying drawings. In description of the embodiment, the PWM driving circuit according to the first embodiment and FIG. 1 will be referenced, and thus, overlapped description will not be repeated.

Figure 5:
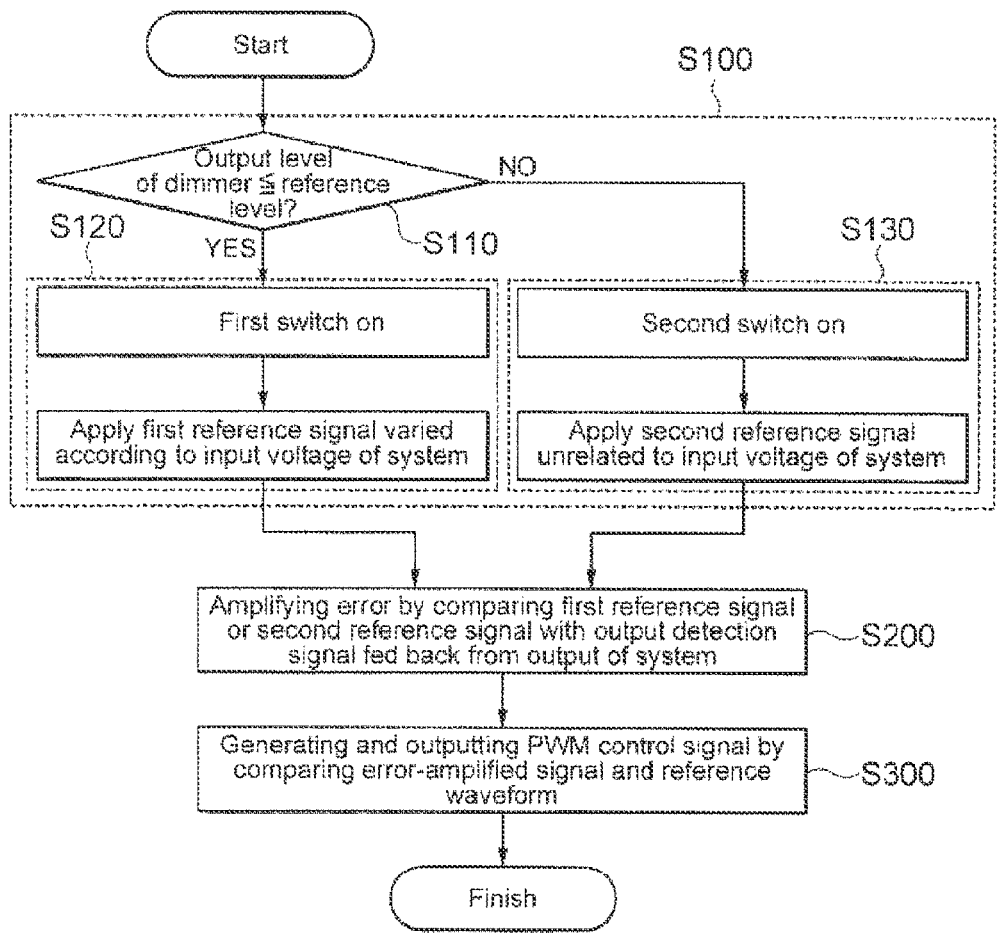
FIG. 5 is a flowchart schematically showing a PWM driving method in accordance with a third exemplary embodiment of the present invention.

FIG. 5 is a flowchart schematically showing the PWM driving method in accordance with a third exemplary embodiment of the present invention.

Referring to FIG. 5, the PWM driving method in accordance with a third exemplary embodiment of the present invention includes applying first and second reference signals (S100), outputting an error amplification signal (S200), and generating and outputting a PWM control signal (S300).

According to one example, the PWM driving method may be a method of driving an LED driving circuit.

First, referring to FIG. 5, in applying the first and second reference signals (S100), when an output voltage level of a dimmer (not shown) is a reference level or less or less than the reference level, a first switch S1 is turned on to apply a first reference signal VREF1 varied according to an input voltage of the system. In addition, in applying the first and second reference signals (S100), when the output voltage level of the dimmer (not shown) is more than the reference level or the reference level or more, a second switch S2 is turned on to apply a second reference signal VREF2, unrelated to the input voltage of the system. Here, the first reference signal VREF1 varied according to the input voltage of the system may be a signal in proportion to the output of the dimmer.

For example, when it is selected whether dimming such as triac dimming is interconverted outside a controller, it is determined whether the reference signal VREF is varied. Here, using a DIM signal output by comparing the output voltage level of the dimmer (not shown) and the reference level, the first reference signal VREF1 varied according to an input voltage VIN of the system and the fixed second reference signal VREF2, unrelated to the input voltage of the system, may be selected.

In addition, on one example, the first reference signal VREF1 may be a signal obtained by averaging the output of the dimmer. Further, in one example, the dimmer (not shown) may be a triac dimmer.

Next, referring to FIG. 5, in outputting the error amplification signal (S200), the applied first reference signal VREF1 or second reference signal VREF2 is compared with the output detection signal $V_{SENSE}$ fed back by detecting the output of the system to amplify an error, outputting the error amplification signal. Depending on whether the output voltage level of the dimmer is the reference level or less or less than the reference level, or more than the reference level or the reference level or more, in outputting the error amplification signal (S200), the first reference signal VREF1 or the second reference signal VREF2 is received as the reference signal.

Next, in generating and outputting the PWM control signal of FIG. 5 (S300), the error amplification signal is compared with the predetermined reference waveform to generate and output the PWM control signal.

The error amplification signal input in generating and outputting the PWM control signal (S300) has a level varied according to a difference between the reference signal and the fed back output detection signal $V_{SENSE}$, and the varied level signal is compared with the predetermined reference waveform to vary a length of a high section of the PWM control signal, performing PWM control In another example, the predetermined reference waveform may be any one of a sawtooth wave, a triangle wave, and a lamp wave. The other waveforms may be used as a reference signal for generating a PWM control signal.

Next, a PWM driving method in accordance with a fourth exemplary embodiment of the present invention will be described in detail with reference to the accompanying drawings. In description of the embodiment, the PWM driving circuit according to the second embodiment and FIG. 2 will be referenced, and thus, overlapped description will not be repeated.

Figure 6:
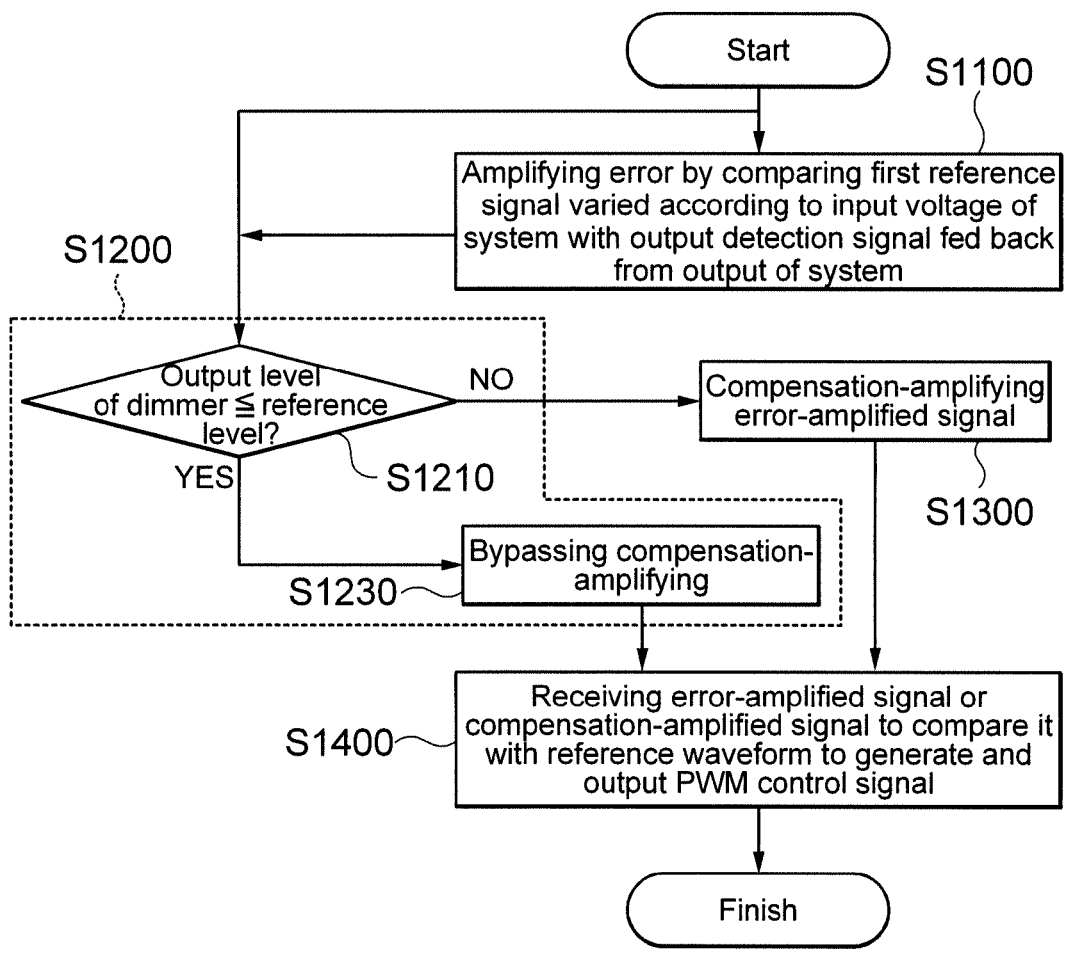
FIG. 6 is a flowchart schematically showing a PWM driving method in accordance with a fourth exemplary embodiment of the present invention

FIG. 6 is a flowchart schematically showing the PWM driving method in accordance with a fourth exemplary embodiment of the present invention.

Referring to FIG. 6, the PWM driving method in accordance with an exemplary embodiment of the present invention includes outputting an error amplification signal (S1100), switching (S1200), compensation-amplifying the signal (S1300), and generating and outputting a PWM control signal (S1400).

According to one example, the PWM driving method may be a method of driving an LED driving circuit.

First, referring to FIG. 6, in outputting the error amplification signal (S1100), the reference signal VREF1 varied according to the input voltage of the system is compared with the output detection signal $V_{SENSE}$ fed back by detecting the output of the system to amplify an error, outputting the error amplification signal. In outputting the error amplification signal (S1100), the reference signal VREF1 may be compared with the fed back signal by an error amplifier to amplify the error.

Next, referring to FIG. 6, in switching (S1200), when the output voltage level of the dimmer (not shown) is the reference level or more or more than the reference level (S1210), the switch is turned off to enter compensation-amplifying the error amplification signal (S1300). In addition, when the output voltage level of the dimmer (not shown) is less than the reference level or the reference level or less (S1210), the switch is turned on (S1230) to bypass compensation-amplifying the error amplification signal (S1300).

Next, referring to FIG. 6, in compensation-amplifying the signal (S1300), the error amplification signal is received according to the off operation of the switch in switching (S1200) to be compensation-amplified.

In addition, in one example, compensation-amplifying the signal (S1300), the signal is compensation-amplified in a phase opposite to the phase in error-amplifying (S1100).

Next, in generating and outputting the PWM control signal (S1400) of FIG. 6, the error amplification signal bypassed according to the on operation of the switch in switching (S1200) or the output compensation-amplified in compensation-amplifying the signal (S1300) is received to be compared with the predetermined reference waveform to thereby generate and output the PWM control signal. In generating and outputting the PWM control signal (S1400), the error amplification signal or compensation amplification signal $V_{FB}$ is compared with the reference waveform. Here, since a level of $V_{FB}$ is varied, the signal is compared with the predetermined reference waveform to vary a length of a high section of the PWM control signal.

In another example, the predetermined reference waveform may be any one of a sawtooth wave, a triangle wave, and a lamp wave. The other waveforms may be used as a reference signal for generating a PWM control signal.

As can be seen from the foregoing, the feedback structure through the photo coupler of the secondary side can be removed, and the control according to the output level of the dimmer of the primary side can be performed.

In one example of the present invention, as the external control signal and the switch are used, the same controller can be used regardless of compatibility of the triac dimmer.

Embodiments of the invention have been discussed above with reference to the accompanying drawings. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention.

What is claimed is:

1. A PWM driving circuit, comprising:
    a dimmer switching unit configured to turn on a first switch to apply a first reference signal varied according to an input voltage of a system when an output voltage level of a dimmer is a reference level or less than the reference level, and turn on a second switch to apply a second reference signal, unrelated to the input voltage of the system, when the output voltage level of the dimmer is more than the reference level or the reference level;
    an error amplification unit configured to compare the first reference signal or the second reference signal applied from the dimmer switching unit with an output detection signal fed back by detecting an output of the system to amplify an error and output an error amplification signal; and
    a PWM control signal generating unit configured to compare the error amplification signal of the error amplification unit with a predetermined reference waveform to output a PWM control signal.

2. The PWM driving circuit according to claim 1, wherein the first reference signal is a signal obtained by averaging the output of the dimmer.

3. The PWM driving circuit according to claim 2, wherein the PWM driving circuit is an LED driving circuit.

4. The PWM driving circuit according to claim 1, wherein the PWM control signal generating unit comprises a comparator configured to receive the error amplification signal at a non-inversion terminal and the predetermined reference waveform at an inversion terminal.

5. The PWM driving circuit according to claim 4, wherein the predetermined reference waveform is any one of a sawtooth wave, a triangle wave, and a lamp wave.

6. The g circuit according to claim 1, wherein the dimmer is a triac dimmer.

7. The PWM driving circuit according to claim 1, wherein the PWM driving circuit is an LED driving circuit.

8. A PWM driving circuit comprising:
    an error amplification unit configured to compare a reference signal varied according to an input voltage of a system with an output detection signal fed back by detecting an output of the system to amplify an error to output an error amplification signal;
    a compensation amplification unit configured to receive and compensation-amplify the error amplification signal of the error amplification unit;
    a dimmer switching unit configured to turn on a switch when an output voltage level of a dimmer is less than a reference level or the reference level or less such that an output of the error amplification unit bypasses the compensation amplification unit; and
    PWM control signal generating unit configured to receive the error amplification signal of the error amplification unit or the output of the compensation amplification unit by switching of the dimmer switching unit to compare with a predetermined reference waveform and output a PWM control signal.

9. The PWM driving circuit according to claim 8, wherein the compensation amplification unit compensation-amplifies the signal in a phase opposite to a phase of the error amplification unit.

10. The PWM driving circuit according to claim 8, wherein the PWM control signal generating unit comprises a comparator configured to receive the error amplification signal or the output of the compensation amplification unit at a non-inversion terminal and the predetermined reference waveform at an inversion terminal.

11. The PWM driving circuit according to claim 10, wherein the predetermined reference waveform is any one of a sawtooth wave, a triangle wave, and a lamp wave.

12. The PWM driving circuit according to claim 8, wherein the dimmer is a triac dimmer.

13. The PWM driving circuit according to claim 8, wherein the PWM driving circuit is an LED driving circuit.

14. A PWM driving method, comprising:
    turning on a first switch to apply a first reference signal varied according to an input voltage of a system when an output voltage level of a dimmer is a reference level or less than the reference level, and turning on a second switch to apply a second reference signal, unrelated to the input voltage of the system, when the output voltage level of the dimmer is more than the reference level or the reference level;
    amplifying an error by comparing the applied first reference signal or the second reference signal with an output detection signal fed back by detecting an output of the system, and outputting an error amplification signal; and
    comparing the error amplification signal with a predetermined reference waveform to generate and output a PWM control signal.

15. The PWM driving method according to claim 14, wherein the first reference signal is a signal obtained by averaging the output of the dimmer.

16. The PWM driving method according to claim 15, wherein the PWM driving method is a method of driving an LED driving circuit.

17. The PWM driving method according to claim 14, wherein the PWM driving method is a method of driving an LED driving circuit.

18. A PWM driving method comprising:
    amplifying an error by comparing a reference signal varied according to an input voltage of a system with an output detection signal fed back by detecting an output of the system, and outputting an error amplification signal;
    switching off a switch when an output voltage level of a dimmer is a reference level or more or more than the reference level to enter compensation-amplifying the error amplification signal, and switching on the switch When the output voltage level is less than the reference level or the reference level or less to bypass compensation-amplifying the error amplification signal;
receiving and compensation-amplifying the error amplification signal according to the off operation of the switch in switching; and
receiving the error amplification signal bypassed according to the on operation of the switch in switching or the output compensation-amplified in compensation-amplifying to compare with a predetermined reference waveform and generating and outputting a PWM control signal.

19. The PWM driving method according to claim 18, wherein, in compensation-amplifying, the signal is compensation-amplified in a phase opposite to a phase in error-amplifying.

20. The PWM driving method according to claim 18, wherein the PWM driving method is a method of driving an LED driving circuit.

* * * * *